United States Patent [19]

Nathenson et al.

[11] Patent Number: 4,458,166
[45] Date of Patent: Jul. 3, 1984

[54] DYNAMOELECTRIC MACHINE WITH A SALIENT POLE ROTOR

[75] Inventors: Richard D. Nathenson, Pittsburgh; Charles W. Pipich, Monroeville, both of Pa.; Joseph R. Kopnitsky, deceased, late of Trafford, Pa., by Mary C. Kopnitsky, executrix

[73] Assignee: Westinghouse Electric Corp., Pittsburgh, Pa.

[21] Appl. No.: 249,306

[22] Filed: Mar. 31, 1981

[51] Int. Cl.³ ............................................. H02K 11/00
[52] U.S. Cl. ..................................... 310/71; 310/201; 310/269; 339/219 R
[58] Field of Search ................ 310/261, 269, 71, 201, 310/260, 198, 42, 206, 218, 207, 179, 262; 336/192; 330/22 B, 17 F, 219

[56] References Cited

U.S. PATENT DOCUMENTS

| | | | |
|---|---|---|---|
| 1,471,834 | 10/1923 | Defibaugh | 310/71 |
| 2,132,274 | 10/1938 | Savage | 310/262 |
| 3,252,019 | 5/1966 | Sargent | 310/269 |
| 3,588,557 | 6/1971 | Kilgore | 310/269 |
| 3,590,301 | 6/1971 | Woydt | 310/269 |
| 4,099,076 | 7/1978 | Hucker | 310/269 |
| 4,227,107 | 10/1980 | Ban | 310/206 |
| 4,303,842 | 12/1981 | Nathenson | 310/71 |

*Primary Examiner*—R. Skudy
*Attorney, Agent, or Firm*—William D. Lanyi

[57] ABSTRACT

An electrical connection system is provided for the salient poles of a hydrogenerator rotor. The system provides for identically wound salient poles to be connected in a manner that achieves opposite electromagnetic polarity of adjacent salient poles while eliminating the requirements of crossover connections during final assembly of the poles to the rotor or during field replacement of salient poles.

9 Claims, 10 Drawing Figures

DYNAMOELECTRIC MACHINE WITH A SALIENT POLE ROTOR

BACKGROUND AND SUMMARY OF THE INVENTION

This invention pertains to the electrical interconnections of the salient poles of a dynamoelectric machine's rotor and, more particularly, to a system for connecting the salient poles of a hydrogenerator whereby the poles, while being connected in series, each assume an opposite magnetic polarity than their adjacent neighboring poles.

Hydrogenerators typically have rotors constructed of a rotatable shaft with a cylindrical rim on which an even number of salient poles are mounted. The shaft may be aligned vertically with a connection to a turbine at the lower end. The salient poles are mounted about the periphery of the cylindrical rim with each salient pole being of opposite electromagnetic polarity than its immediately adjacent neighboring poles.

Each salient pole contains a helically wound field coil and the alternating polarity can be accomplished in two basic ways. First, the salient poles can have their field coils wound in such a way as to have half of them wound in a direction to produce a magnetically north field and the other half of them wound to produce a magnetically south field when a field current is passed through the field coil in basically the same manner. Second, as in the present invention, the salient poles all have their field coils wound identically but are connected in series in such a way as to provide opposite current flow directions in the north poles than in the south poles.

Both of these methods can present disadvantages, either in manufacturing the poles themselves or in electrically connecting the poles during their final assembly on the cylindrical pole-carrying rim. The first method requires two different designs, depending upon the polarity of the pole, which can not only complicate the manufacturing process but increase the number of spare poles required after installation to insure preparedness in the case of a breakdown involving the salient poles. Also, during field repair operations, care must be taken in replacing the poles to insure that the faulty pole is replaced by an identically wound one.

In the alternative, if all salient poles are identically wound, the polarity alternation between poles must be accomplished by a connection system external to the salient pole itself. This connection system must not be so complex as to lessen the advantages gained by using identically wound salient poles. Considerable savings can be achieved if all salient poles can be wound identically and each can be electrically connected during final assembly in a similar manner, regardless of polarity.

The present invention relates to an electrical connection system for connecting identically wound salient poles in series while producing opposite electromagnetic polarity in alternate poles. A hydrogenerator with a rotor of salient pole construction as referred to in this application is described in detail in U.S. Pat. No. 4,303,842 which issued to R. D. Nathenson, on Dec. 1, 1981 assigned to Westinghouse Electric Corporation and incorporated by reference herein. The present invention specifically relates to the salient poles of a hydrogenerator rotor which has a generally cylindrical pole mounting rim at the upper end of a vertically mounted rotatable shaft and, more specifically, to a rim having indentations in its upper planar surface in which the connections are made.

The indentations serve the primary purpose of providing the space required to make the required electrical connections and, in water-cooled hydrogenerator rotors, piping connections. An indentation is located proximate the point where each salient pole is mounted to the rim and provides an opening through both the peripheral and planar surfaces of the rim. The position of the indentation allows access to the location of the present invention radially inward from the salient pole in a horizontal direction and vertically downward from the cylindrical rim's upper planar surface. Locating the present invention in these indentations shortens the required length of connecting straps while making access possible from above during assembly operations and reducing the total volume required for the connection system of the present invention. Since the present invention is thus positioned below the upper planar surface of the cylindrical rim, less space is required for the connection apparatus.

The present invention comprises, for each pole, two rigid conductive leads, two flexible conductive straps, a threaded stud, an insulative cylindrical sleeve, two conductive tabs, and an insulative separator. Each lead is generally Z-shaped and most probably made from flat bar stock. One end segment of each lead has a round hole therethrough, large enough to accommodate the threaded stud with the insulative cylindrical sleeve disposed around the stud.

The two leads are positioned within the rim's indentation and with their holes aligned coaxially. Furthermore, the two leads are aligned such that they extend in opposite directions from the axis of the holes and combine to form a line which is generally perpendicular to the radius of the cylindrical rim. The dimensions of the leads are such that their segments with holes lie near the bottom surface of the indentation, their central segments are generally perpendicular to the upper planar surface of the cylindrical rim and their remaining segments lie adjacent to and generally parallel with the upper planar surface of the cylindrical rim.

The threaded stud is disposed within the insulative cylinder which is itself disposed through the two coaxial holes. In order to mechanically fasten the two leads to the bottom surface of the indentation, the threaded stud is disposed into a threaded hole in the bottom of the indentation with the other end of the stud being disposed into a threaded nut. The two leads are thus fastened together and to the cylindrical rim with the insulative separator disposed between them to prevent electrical contact between the two leads.

One of the conductive tabs is connected to the segment of each lead which has the hole therethrough and is connected generally perpendicularly to the upper planar surface of the cylindrical rim. These tabs provide a point of electrical connection between the lead to which it is connected and the field coil of the salient pole. The positioning of the tabs on the leads determines the eventual polarity of the salient pole. By positioning the tab between the hole and the vertical segment of its lead, one polarity is achieved. Alternatively, by positioning the tab between the hole and the vertical section of the other lead, an opposite polarity is achieved. The polarities are determined by the positioning of the tabs since the present invention also connects each tab to the closest of two connection points of the salient pole which are generally radially outward from the two tabs. The connection between each tab and its closest pole connection point is made by flexible conductive straps and, due to the nature of the present invention, no crossover connections are required for either north or south polarity connections.

BRIEF DESCRIPTION OF THE DRAWINGS

The present invention will be more fully understood from the following detailed description of the preferred embodiment, read in conjunction with the accompanying drawings, in which.

DESCRIPTION OF THE PREFERRED EMBODIMENT

Figure 1:
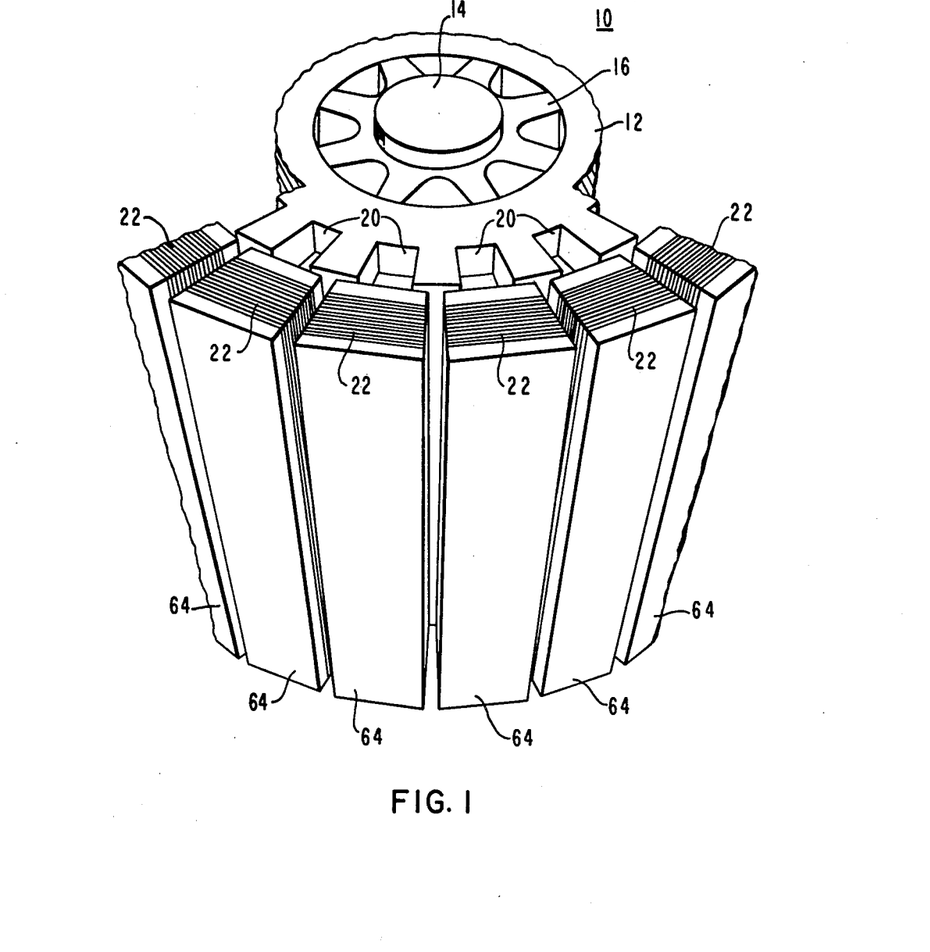
FIG. 1 is an exemplary depiction of a typical hydrogenerator rotor with salient poles disposed thereon and with indentations into which the present invention may be disposed.
Figure 2A:
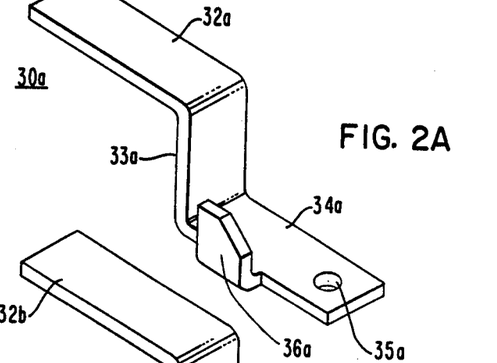
FIG. 2a shows a lead configured with a conductive tab positioned between the mechanical fastening location and the central segment of the lead.
Figure 2B:
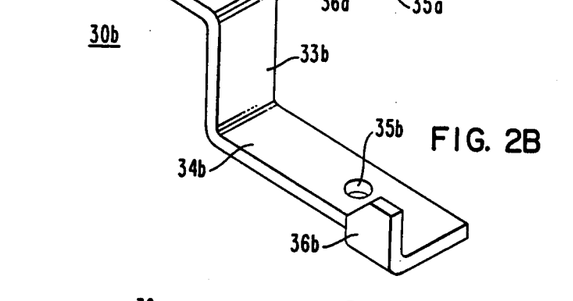
FIG. 2b shows a lead configured with a conductive tab positioned with the fastening location between the tab and the central segment of the lead.
Figure 2C:
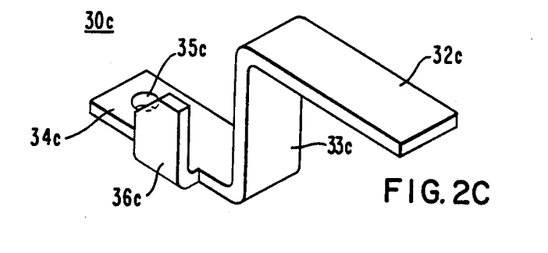
FIG. 2c shows a lead configured similarly to the lead shown in FIG. 2a but with an opposite orientation.
Figure 2D:
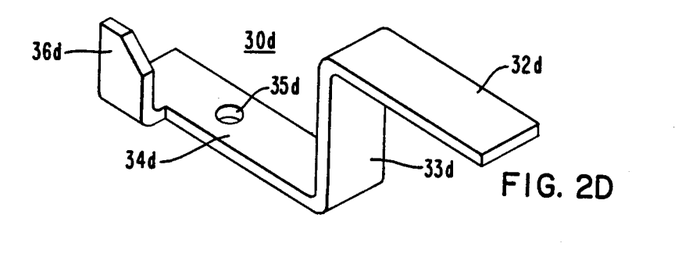
FIG. 2d shows a lead configured similarly to the lead shown in FIG. 2b but with an opposite orientation.

FIG. 1 depicts an exemplary hydrogenerator rotor 10 as would be typical of those to which the electrical connection system of the present invention would be applied. The rotor shaft 14 is suspended vertically with a generally cylindrical rotor rim 12 disposed about its upper portion. Typically this rim 12 is mounted on a spider 16 which is connected to the rotor shaft 14. The rotor rim 12 depicted in FIG. 1 is used to support a plurality of salient poles 64. The field coil 22 portion of each salient pole 64 is helically wound around the pole as set forth in U.S. Pat. No. 4,303,842 issued on Dec. 1, 1981 to R. D. Nathenson and mentioned above. The poles 64 are attached to the rotor rim 12 at positions adjacent to indentations 20 in the rim 12. These indentations 20 serve the primary purpose of providing space for the electrical and, in the case of a water-cooled rotor, water piping connections between the poles. FIG. 1, for reasons of visual clarity, does not depict the electrical connection system of the present invention, which would be disposed within each indentation 20 as will be described below.

Since the advantage of the present invention lies in its ability to be easily varied in structure to alternate the polarity of its associated salient pole 64, the figures have been constructed to clearly and completely describe this feature. FIGS. 2a through 2d show the four basic configurations that comprise the possible variations. These configurations are labeled 30a through 30d and, for simplicity, all similar components are labeled with the same reference numeral in all configurations, but with a different suffix letter to designate the configuration group to which it applies.

Configuration 30a will be described in detail with the intention that the descriptions contained herein apply to all similarly numbered components regardless of their suffix letter. The lead configuration 30a has a first segment 32a, a second segment 33a and a third segment 34a. Each of these segments is made from a rigid conductive material, most probably copper, and has a generally parallelepiped shape. The three segments can be connected together to form the depicted Z-shaped combination although the easiest, and suggested, way to manufacture the assembly is to bend a single flat bar in two places, in opposite directions, to form a three-segment lead 30a. A hole 35a is drilled in the third segment through its smallest dimension, or thickness. The position of the hole 35a, although always through the third segment 34a, will vary depending upon the lead configuration to be achieved. As shown in configurations 30a and 30c, the hole (35a and 35c, respectively) is positioned proximate the end of the third segment (34a or 34c) that is farthest from its respective second segment (33a or 33c), whereas the holes in configurations 30b and 30d are more centrally located in their respective third segments (34b and 34d). This is true even though the distance from the centerline of the hole to the line where its corresponding second and third segments are coterminal is generally equal for all configurations (30a through 30d). The apparent difference in hole position is due to the fact that in configurations 30b and 30d, the third segments (34b and 34d) are longer than their corresponding components, 34a and 34c, and extend beyond the locations of the hole a greater distance from their second segments.

The third segment 34a has a rigid conductive tab 36a connected to it. This tab 36a is connected perpendicularly to the major surface of the third segment 34a as shown. The position of this tab 36a, relative to the hole 35a determines the eventual polarity of the salient pole. The specific implications of this tab 36a positioning will be described in detail below, but the possible positions include the tab (36a or 36c) being between the hole and the second segment (as in 30a and 30c) or with the hole between the tab and the second segment (as in 30b and 30d). The four configurations of leads shown in FIGS. 2a through 2d are, in all cases, grouped in pairs to comprise either of two variations of the present invention. Either leads 30a and 30c are combined or leads 30b and 30d are combined. These two combinations are sufficient to electrically connect all of the salient poles of a hydrogenerator rotor, with one combination used for north polarity poles and the other for south polarity poles.

Figure 3:
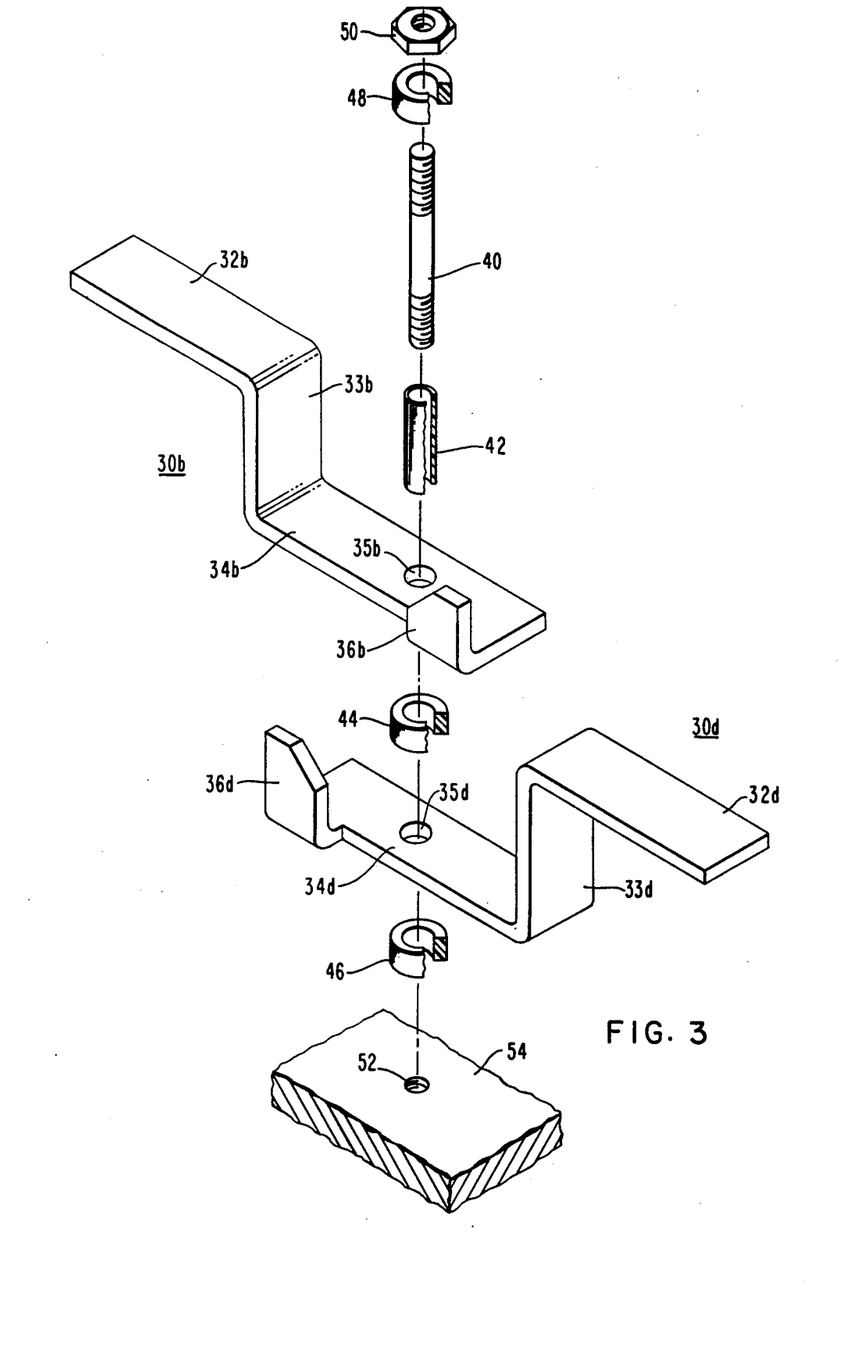
FIG. 3 shows an exploded view of one of the two combinations of leads of the present invention.

FIG. 3 is an exploded view of one of the two above-mentioned combinations. It shows leads 30b and 30d combined to form one of the two possible variations of the present invention. It should be understood that FIG. 3 could equally be illustrated with the alternate combination of 30a and 30c. Leads 30b and 30d are positioned with their respective holes (35b and 35d, respectively) aligned coaxially and with their second segments (33b and 33d, respectively) extending in the same direction and generally parallel to each other. The leads' first segments (32b and 32d) lie on the same plane and extend from the holes' axis in generally opposite directions. The two leads are thus positioned generally colinearly with each other as shown in FIG. 3. Between the two third segments is an insulative separator 44 which prevents electrical contact between the leads. The separator 44 is shown as being generally cylindrical with a hole therethrough but it should be understood that, functionally, this is not a requirement. Similarly, an insulative separator 46 is shown below the third segment (34d) of lead 30d. This separator 46, functionally, prevents electrical contact between the lower lead 30d and the bottom 54 of the rotor rim indentation. Through and coaxial with the holes (35b and 35d) is disposed an insulative cylinder 42. The function of the cylinder 42 is to prevent electrical contact between either of the two leads (30b or 30d) and the threaded stud 40 which passes through the two holes (35b and 35d) and the two separators (44 and 46) and is threaded into a hole 52 in the bottom 54 of the rotor rim indentation. A nut 50 is connected to the upper end of the threaded stud 40 with an insulation separator 48 below it. The function of the separator 48 is to prevent electrical contact between the nut 50 and the third segment of the upper lead (in this case 30b). This electrical contact, if not prevented, would have the deleterious effect of placing the upper lead 30b in electrical communication with the bottom 54 of the rotor rim indentation since the threaded stud 40, in all likelihood, will be conductive.

It can be seen from FIG. 3 that the assembly of the described components will result in the two leads (30b and 30d) being mechanically fastened to the bottom 54 of the rotor rim indentation in a rigid manner but with no electrical communication between the leads (30b and 30d) and the threaded stud 40, the bottom 54 of the rotor rim indentation or the nut 50. It should also be noted that, for proper assembly of the components of FIG. 3, certain dimensional relationships must be maintained. The outside diameter of the insulative cylinder 42 must be less than the inside diameters of the two holes (35b and 35d) and less than the inside diameters of the three insulative separators (44, 46 and 48), while the inside of the insulative cylinder 42 must be larger than the diameter of the threaded stud 40. Also, it should be noted that since the two third segments (34b and 34d) do not lie in the same plane with each other but the two first segments (32b and 32d) do, the length of the two second segments (33b and 33d) must differ in length to compensate for this. For similar reasons which will be obvious from the discussion below, the lengths of the two tabs (36b and 36d) will differ so that their upper termini will be of generally equal heights relative to the rotor rim.

Figure 4A:
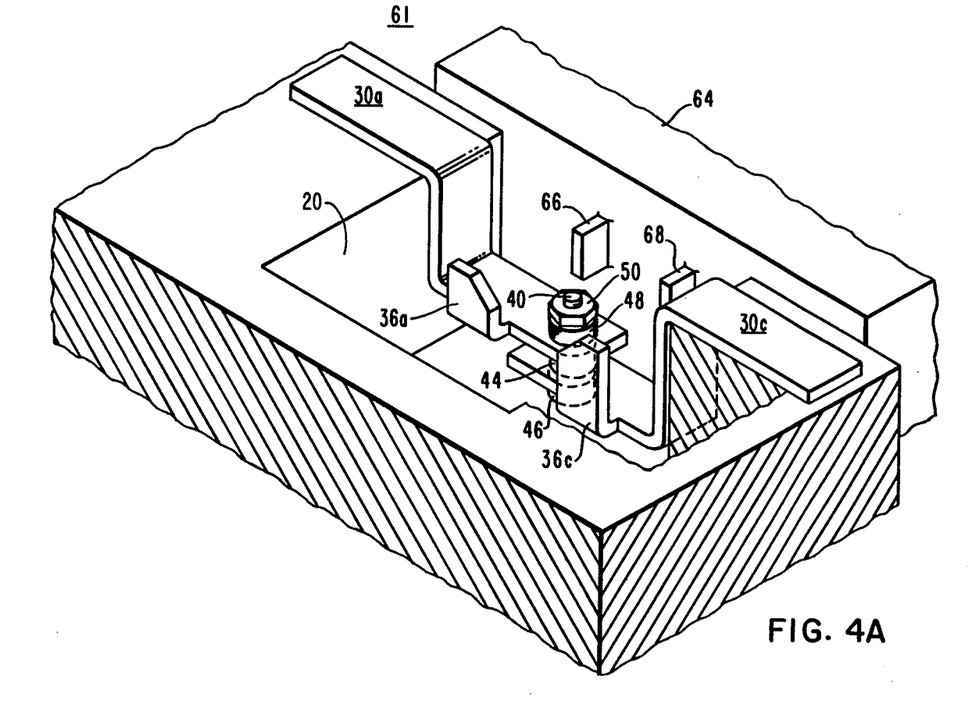
FIG. 4 shows both combinations of leads of the present invention including a magnetically north and a magnetically south electrical connection system.
Figure 4B:
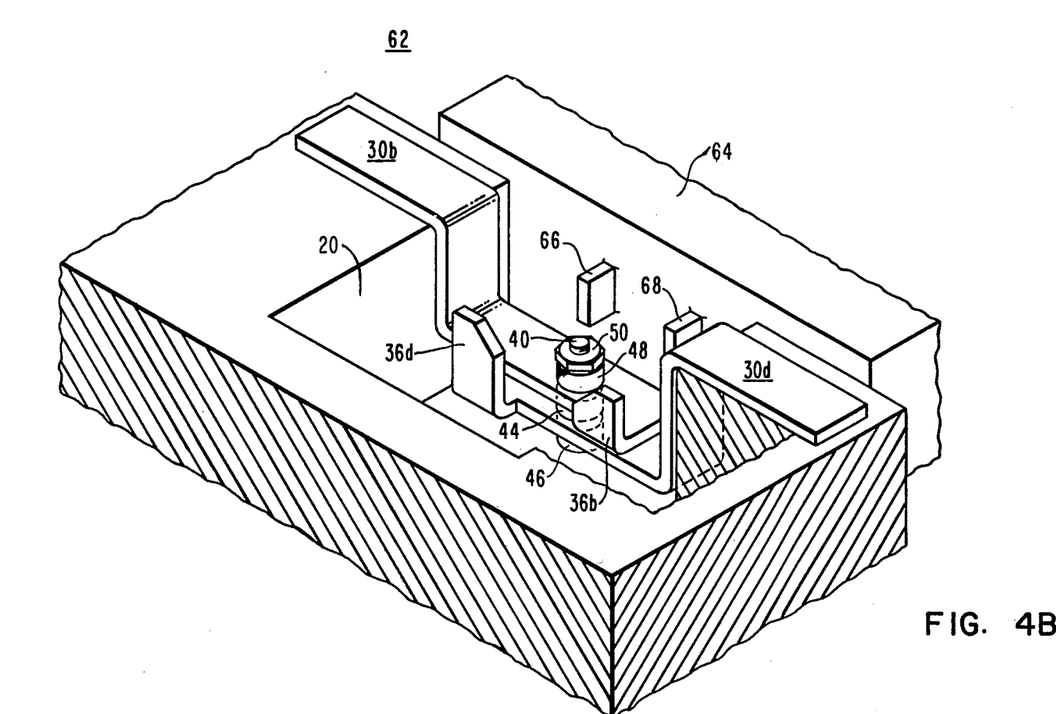

FIGS. 4A and 4B show the two possible variations of the present invention, having opposite electromagnetic polarities. Each depiction is shown as it would be seen as viewed from the center of the cylindrical rotor rim looking radially outward toward the electrical connection system of the present invention and its associated salient pole. The first combination 61 comprises leads 30a and 30c and the second combination 62 comprises leads 30b and 30d. Each combination is disposed within a rotor rim indentation proximate a salient pole 64 which has a first 66 and second 68 connection point. Both combinations comprise the insulative separators (44, 46 and 48), the threaded stud 40 and the nut 50. It can be seen that combination 61 allows for electrical connections between tab 36a and connection point 66 and between tab 36c and connection point 68 without any required crossover of the connection means. The two connection points (66 and 68) are electrically connected to the two termini of the helically wound field coil (reference numeral 22 in FIG. 1). The abovementioned connections will be made with flexible conductive straps 70. These straps are not shown in FIG. 4A or FIG. 4B for purposes of visual clarity but are described below and shown in FIG. 5. If a voltage convention is adopted wherein the higher potential lead is on the left as viewed from the center of the rotor rim, connecting tab 36a to connection point 66 and connecting tab 36c to connection point 68 will cause a current to flow through the field coil of the salient pole 64 in a predetermined direction and create an electromagnetic field of a predictable polarity.

With reference to combination 62 of FIG. 4B, it can be seen that applying the flexible conductive straps 70 in similar manner would have the opposite result. If the flexible straps 70 were used to connect the connection points (66 and 68) to their nearest conductive tab (36d or 36b), without any crossover connections, the result would be to electrically connect connection point 66 with tab 36d of lead 30d and to electrically connect connection point 68 with tab 36b of lead 30b. Thus, under the same voltage convention described above and with the flexible straps applied similarly as above, the polarity of the field coil of the salient pole 64 is the opposite of the one shown in FIG. 4A. Connection point 68 is now in direct electrical communication with the lead 30b, which under the assumed convention is the higher voltage lead.

The two combinations shown in FIGS. 4A and 4B, along with the description above, demonstrate the advantages of the present invention. By using identical salient poles 64, opposite electromagnetic polarities can be achieved by merely combining the components of the present invention in two distinct configurations (reference numerals 61 or 62 in FIGS. 4A and 4B). This allows the final connections, using flexible straps 70, to be made identically for all salient poles 64. This connection is shown in FIG. 5 as it would appear, regardless if leads 30a and 30c or leads 30b and 30d are used.

The advantages of the present invention should now be evident to one skilled in the art. The salient poles 64 can all be manufactured in an identical manner, thus reducing the manufacturing costs and the required numbers of spare salient poles 64 to be stored in case of breakdowns. Also, it should be obvious that, whtn a salient pole 64 is replaced, there is virtually no chance of misconnecting the flexible straps since, for all poles, the straps run radially outward from the tabs 36 to the connection points (reference numerals 66 or 68 in FIGS. 4A, 4B and 5).

Figure 5:
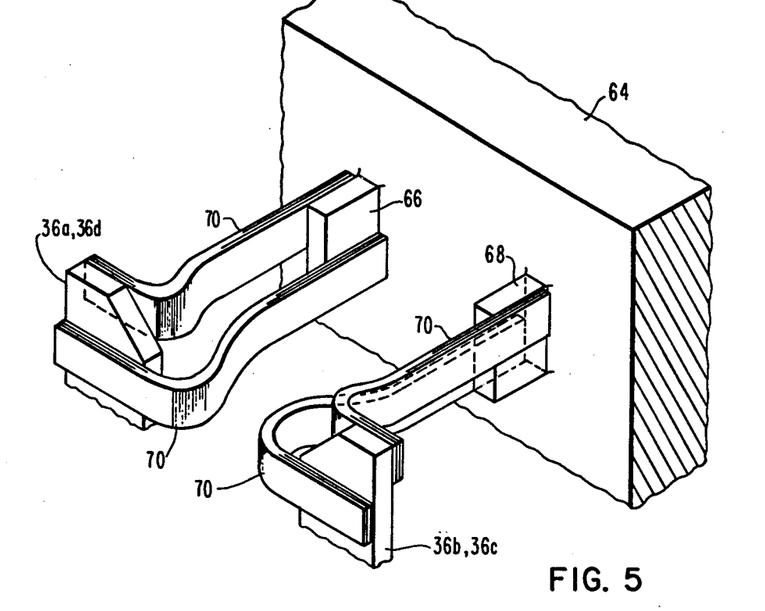
FIG. 5 shows the flexible conductive straps of the present invention connecting its tabs to the connection points of a salient pole.

FIG. 5 shows an isolated view of a portion of the configuration shown in FIGS. 4A and 4B along with the flexible conductive straps 70 that were referred to above. Shown in FIG. 5 are the two connection points, 66 and 68, of the salient pole 64, the tabs (36a through 36d) and the flexible straps 70. As described above, in the present invention connection point 66 will always be located radially outward from either tab 36a or tab 36d, while connection point 68 will always be located radially outward from tab 36b or tab 36c. In each case the specific tabs are determined by the chosen combinations of either leads 30a and 30c or leads 30b and 30d. Regardless of the combination chosen, the flexible straps 70 will be connected as shown in FIG. 5 with no crossovers.

Although the flexible straps 70 are shown connected in combinations of two and having a particular shape, the only functional requirement of the flexible straps 70 is that each strap has one end that is connectable to any of the tabs (36a through 36d) and the other end connectable to either connection point (66 or 68) of the salient pole 64. Any flexible conductive connection means that fits these requirements is suitable for use in the present invention. The need for flexibility is dictated in cases where the salient poles 64 are subjected to sufficient centrifugal forces to cause a slight motion radially outward from the tabs.

Figure 6:
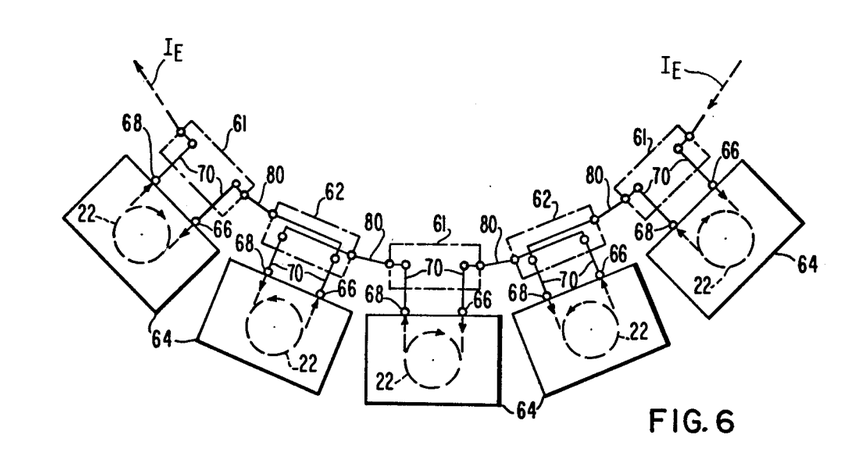
FIG. 6 is a schematic illustration of the electrical circuit resulting from the use of the configuration of the present invention in an alternating fashion.

FIG. 6 shows the resultant electrical circuit when the present invention is applied to a salient pole rotor as described herein. The excitation current $I_E$ is shown in FIG. 6 as originating to the right of the illustration. This current, in a typical hydrogenerator rotor, is supplied by an external source and passes through all of the salient poles 64 before leaving the rotor. Only five of the salient poles 64 are shown for illustrative purposes. Every salient pole is associated with one of the two lead configurations, 61 or 62, described above. By alternating the lead configurations, as shown in FIG. 6, the direction of current flow through the field coils 22 of the salient poles is alternated. When configuration 61 is applied to a salient pole 64, the current enters the field coil 22 at connection point 66, passes through the field coil 22 in a predetermined direction and leaves the salient pole 64 at connection point 68. In contrast, when configuration 62 is used the current enters the field coil 22 at connection point 68, passes through the field coil 22 in the opposite direction and leaves the salient pole 64 at connection point 66. The direction of current through the field coil 22 determines the polarity of the field coil 22 and, hence, its associated salient pole 64. The current is shown passing through the field coil 22 in the plane of the Figure for illustrative purposes only. In typical applications the field coil 22 is disposed in a plane perpendicular to the top planar surface of the rim 12 as shown in FIG. 1.

Also in FIG. 6, the flexible leads 70 are depicted schematically between the connection points (66 and 68) and the lead configuration (either 61 or 62). Between adjacent lead configuration assemblies, a rigid conductive bar 80 is used to electrically connect adjacent salient pole leads. One of these bars 80 would be located between each lead configuration assembly and be rigidly fastened to the most proximate first segments of the lead configurations on each side of the rigid conductive bar 80.

Although the present invention has been described with considerable specificity herein it should be understood that the present disclosure has been made only by way of example and that numerous changes in detail, combination and arrangement of components may be accomplished without departing from the spirit and scope of the present invention. For example, the leads (30a through 30d of the figures) are described as being made from flat conductive bars, whereas other shapes that fit the functional requirements described above could easily be applied to the present invention. Similarly, although the fastening means was described in detail as being a threaded stud, any clamping means could be used as long as it mechanically performs the same function while preventing electrical contact between the leads or between any lead and the rotor rim. Also, the present invention could comprise straight, as opposed to Z-shaped, bars in applications that do not utilize indentations in the rotor rim in which to dispose the electrical connection means.

It should be evident to one skilled in the art that the present invention discloses an electrical connection system applicable to electrical machines employing salient poles, specifically hydrogenerators, whereby a novel means for interconnecting the poles is described which results in opposite electromagnetic polarity of adjacent poles using identical salient poles and requiring no crossover connections during final assembly or field repair operations.

What we claim is:

1. An electrical connection system for a rotor of a dynamoelectric machine having a rotatably mounted shaft, a generally cylindrical member mounted on said shaft, said cylindrical member having one peripheral surface and at least one planar surface, said cylindrical member being coaxial with said shaft, said electrical connection system comprising;

a plurality of salient poles, each of said salient poles disposed about said generally cylindrical member;

a plurality of rigid conductive leads;

a plurality of rigid conductive tabs, each of said tabs being connectable to a preselected one of said plurality of rigid conductive leads;

a plurality of identically wound field coils, each of said field coils disposed about a preselected one of said plurality of salient poles, each of said field coils comprising a first terminus connected to a first connection point and a second terminus connected to a second connection point;

means for electrically connecting a preselected one of said first and second connection points to a preselected one of said plurality of rigid conductive tabs;

means for mechanically fastening a preselected one of said rigid conductive leads to said generally cylindrical member;

means for preventing electrical communication between a preselected one of said plurality of rigid conductive leads and said generally cylindrical member;

means for preventing electrical communication between a preselected two of said plurality of rigid conductive leads; and a preselected first one of said plurality of rigid conductive leads being associated with a preselected second one of said plurality of rigid conductive leads in an electrical connection assembly, said second lead forming an overlap of said first lead, said mechanical fastening means being disposed proximate said overlap and mechanically fastening said first and second leads to said generally cylindrical member, said first and second leads being disposed generally parallel to said planar surface of said generally cylindrical member, a preselected one of said tabs being connected to said first conductive lead proximate said overlap, a preselected one of said tabs being connected to said second conductive lead proximate said overlap, a preselected one of said electrically connecting means being connected to both a preselected one of said first and second connection points and a preselected one of said tabs, said preselected one of said tabs being most proximate to said preselected one of said first and second connection point.

2. The electrical connection system of claim 1, further comprising;

a plurality of indentations disposed in said planar surface of said generally cylindrical member, each of said indentations being disposed proximate a preselected one of said plurality of salient poles; and said electrical connection assembly being disposed in a preselected one of said plurality of indentations.

3. The electrical connection system of claim 1, wherein;

each of said plurality of rigid conductive leads is generally Z-shaped comprising a first segment, a second segment and a third segment, each of said segments having a generally parallelepiped shape comprising a length, a width and a thickness, said thickness being less than either said width of said length, said length and said width defining two major surfaces, said second segment being joined to said first segment with said major surfaces of said second segment being generally perpendicular to said major surfaces of said first segment, said third segment being joined to said second segment with said major surfaces of said second segment being generally perpendicular to said major surfaces of said third segment, said first segment and said third segment extending from said second segment in generally opposite directions, said major surfaces of said first segment being generally parallel to said major surfaces of said third segment;

said first one of said conductive leads being associated generally colinearly with said second one of said conductive leads, said first segment of said first lead and said first segment of said second lead extending in generally opposite directions;

said second segment of said first lead being generally parallel with said second segment of said second lead;

said second segment of said first lead extending from said third segment of said first lead in a direction generally away from said generally cylindrical member, and second segment of said second lead extending from said third segment of said second lead in a direction generally away from said generally cylindrical member; and a first preselected one of said tabs being connected to said third segment of said first lead perpendicular to said major surfaces of said third segment of said first lead and perpendicular to said major surfaces of said second segment of said first lead, extending from said third segment of said first lead in a direction away from said generally cylindrical member, a second preselected one of said tabs being connected to said third segment of said second lead, perpendicular to said major surfaces of said third segment of said second lead and perpendicular to said major surfaces of said second segment of said second lead, extending from said third segment of said second lead in a direction away from said generally cylindrical member.

4. The electrical connection system of claim 1, wherein;

said electrical connecting means comprises a flexible conductive strap comprising a first end and a second end, said first end being connectable to a preselected one of said first and second termini, said second end being connectable to a preselected one of said plurality of conductive tabs.

5. The electrical connection system of claim 1, wherein;

said mechanical fastening means comprises a threaded stud disposed through a hole in said third segment of said first lead and disposed through a hole in said third segment of said second lead, said first lead's hole and said second lead's hole being coaxial; and said first stud end is connectable to said generally cylindrical member, said second stud end being connectable to a means for preventing said third segments of said first and second leads from moving in a direction away from said generally cylindrical member.

6. The electrical connection system of claim 5, further comprising;

an insulative cylinder disposed about said stud, said stud comprising a first stud end and a second stud end;

7. The electrical connection system of claim 3, wherein;

said first preselected one of said tabs is connected to said third segment of said first lead between said second segment of said first lead and said mechanical fastening means; and said second preselected one of said tabs is connected to said third segment of said second lead between said second segment of said second lead and said mechanical fastening means.

8. The electrical connection system of claim 3, wherein;

said mechanical fastening means is disposed between said second segment of said first lead and said first preselected one of said tabs.

9. The electrical connectional system of claim 3, wherein;

said mechanical fastening means is disposed between said second segment of said second lead and said second preselected one of said tabs.

* * * * *